(12) United States Patent
Lee et al.

(10) Patent No.: US 7,488,110 B2
(45) Date of Patent: Feb. 10, 2009

(54) END-PLATE FOR LINEAR MOTION SLIDER AND LINEAR MOTION SLIDER IN USE WITH THE END-PLATE

(75) Inventors: Jin-Kwoan Lee, Seoul (KR); Chang-Won Yang, Goyang (KR)

(73) Assignee: SBC Linear Co., Ltd., Seoul (KR)

( * ) Notice: Subject to any disclaimer, the term of this patent is extended or adjusted under 35 U.S.C. 154(b) by 331 days.

(21) Appl. No.: 11/438,064

(22) Filed: May 22, 2006

(65) Prior Publication Data

US 2007/0237437 A1 Oct. 11, 2007

(30) Foreign Application Priority Data

Apr. 11, 2006 (KR) ........................ 10-2006-0032760
Apr. 11, 2006 (KR) ........................ 10-2006-0032761

(51) Int. Cl.
*F16C 29/06* (2006.01)
*F16C 33/10* (2006.01)
*F16H 29/02* (2006.01)

(52) U.S. Cl. ...................... 384/45; 384/15; 74/89.36; 74/89.23

(58) Field of Classification Search ............. 384/13–15, 384/43–45, 49–51; 74/89.29, 89.33, 89.36, 74/89.23
See application file for complete search history.

(56) References Cited

U.S. PATENT DOCUMENTS

| | | | | |
|---|---|---|---|---|
| 4,363,526 A | * | 12/1982 | Teramachi | 384/45 |
| 4,616,886 A | * | 10/1986 | Teramachi | 384/45 |
| 4,799,803 A | * | 1/1989 | Tanaka | 384/43 |
| 4,974,971 A | * | 12/1990 | Tanaka | 384/45 |
| 5,238,309 A | * | 8/1993 | Ise | 384/45 |
| 5,562,346 A | * | 10/1996 | Kuo | 384/45 |
| 5,829,883 A | * | 11/1998 | Kawaguchi et al. | 384/45 |
| 6,045,265 A | * | 4/2000 | Shirai et al. | 384/45 |
| 6,142,671 A | * | 11/2000 | Ise | 384/45 |
| 6,200,031 B1 | * | 3/2001 | Faulhaber et al. | 384/45 |
| 6,553,855 B2 | * | 4/2003 | Takahashi et al. | 74/89.36 |
| 7,121,724 B2 | * | 10/2006 | Lee et al. | 384/45 |
| 7,306,373 B2 | * | 12/2007 | Yamazaki et al. | 384/45 |
| 2001/0048775 A1 | * | 12/2001 | Michioka et al. | 384/45 |
| 2005/0018934 A1 | * | 1/2005 | Lee et al. | 384/45 |

(Continued)

FOREIGN PATENT DOCUMENTS

JP 09264322 A * 10/1997

(Continued)

*Primary Examiner*—Marcus Charles
(74) *Attorney, Agent, or Firm*—Rothwell, Figg, Ernst & Manbeck, P.C.

(57) ABSTRACT

End-plates for linear motion sliders and linear motion sliders for use with the end-plates, particularly an end-plate for linear motion sliders and a linear motion slider for use with the end-plate, in which first and second support portions, which contact and support the outer surfaces of balls, are provided in the circumferential inner surface of the end-plate, and a space is defined between the outer surfaces of the balls and a junction surface between the first and second support portions. Therefore, the stiffness of the end-plate is increased, and the balls can stably circulate in a slider, thus reducing noise and vibration. Furthermore, the space serves to keep lubricant therein, whereby the balls can more efficiently circulate in the slider.

4 Claims, 6 Drawing Sheets

U.S. PATENT DOCUMENTS

2005/0232520 A1* 10/2005 Yamazaki et al. ............. 384/45
2006/0177163 A1* 8/2006 Neufang et al. ............... 384/45
2006/0204151 A1* 9/2006 Wang et al. ................... 384/13

FOREIGN PATENT DOCUMENTS

JP 2000320640 A * 11/2000
JP 2001214932 A * 8/2001

* cited by examiner

END-PLATE FOR LINEAR MOTION SLIDER AND LINEAR MOTION SLIDER IN USE WITH THE END-PLATE

RELATED APPLICATIONS

The present disclosure relates to subject matter contained in priority Korean Application Nos. 10-2006-0032760 and 10-2006-0032761 filed on 11 Apr. 2006, which are herein expressly incorporated by reference in its entirety.

BACKGROUND OF THE INVENTION

1. Field of the Invention

The present invention relates generally to end-plates for linear motion sliders and linear motion sliders for use with the end-plates and, more particularly, to an end-plate for linear motion sliders and a linear motion slider for use with the end-plate, in which first and second support portions, which contact and support the outer surfaces of balls, are provided in the circumferential inner surface of the end-plate, and a space is defined between the outer surfaces of the balls and a junction surface between the first and second support portions, so that the stiffness of the end-plate is increased, and the balls can stably circulate in a slider, thus reducing noise and vibration, and so that the space serves to keep lubricant therein, thereby the balls can more efficiently circulate in the slider.

2. Description of the Related Art

A representative conventional linear motion unit was proposed in Japanese Patent Publication No. 1987-200015.

The conventional linear motion unit includes a guide rail, which has ball guide grooves therein, a block body, bearing blocks, each of which has an end-plate, and which are coupled to the respective opposite ends of the block body, and a plurality of balls, which are interposed between the guide rails and the bearing blocks.

The block body has therein load ball passing holes, no-load ball passing holes and grooves.

The balls are provided in the pipes, which are provided in the no-load ball passing holes and grooves. Grooves, which hold the opposite ends of the pipes, are formed in the end-plates.

Each groove, which is formed in each end-plate, has a 'U'-shaped cross-section.

Therefore, when the balls move along the groove, each ball comes into point contact with the groove.

Thus, the balls unevenly move along the groove, thereby causing noise and vibration.

Furthermore, the balls cannot rotate smoothly. Accordingly, there is a problem in that the balls strike parts of the end-plates, thus damaging the end-plates.

Meanwhile, in the conventional linear motion unit having the above-mentioned construction, a lubricant injection hole for supplying lubricant is formed in each end-plate.

Due to spatial restrictions, the lubricant injection hole is formed at an eccentric position in the end-plate.

As such, because the lubricant injection hole is formed at the eccentric position, different amounts of lubricant are supplied to each of the grooves, which are disposed at opposite positions in the end-plate.

SUMMARY OF THE INVENTION

Accordingly, the present invention has been made keeping in mind the above problems occurring in the prior art, and an object of the present invention is to provide an end-plate for linear motion sliders and a linear motion slider for use with the end-plate, in which first and second support portions, which contact and support the outer surfaces of balls, are provided in the circumferential inner surface of the end-plate, and a space is defined between the outer surfaces of the balls and a junction surface between the first and second support portions, so that the stiffness of the end-plate is increased, and the balls can stably circulate in a slider, thus reducing noise and vibration, and so that the space serves to keep lubricant therein, whereby the balls can more efficiently circulate in the slider.

Another object of the present invention is to provide an end-plate for linear motion sliders in which the length of a path between a first outside ball circulation groove and a lubricant injection hole is shorter than the length of a path between a second outside ball circulation groove and the lubricant injection hole, and the cross sectional area of a first lubricant inlet is less than the cross sectional area of a second lubricant inlet, so that lubricant can be evenly supplied to the outside ball circulation grooves.

In an aspect, the present invention provides an end-plate, which is provided on a linear motion slider and includes an end-plate body having an outside ball circulation groove therein.

First and second support portions are provided on the circumferential inner surface of the end-plate body and contact and support outside surfaces of balls, and a space is defined between the outer surfaces of the balls and a junction surface between the first and second support portions.

Due to this construction, the stiffness of the end plate is enhanced, and the balls can stably move along the outside ball circulation groove, so that noise and vibration are reduced. Furthermore, there is an advantage in that, because the space serves to keep lubricant therein, the balls can more efficiently circulate.

The first support portion may be disposed above a horizontal plane passing through the center of the outside ball circulation groove, and the second support portion may be disposed under the horizontal plane passing through the center of the outside ball circulation groove. Thus, the balls can stably move without being biased to one side of the outside ball circulation groove.

Preferably, a first insertion slit may be formed in a vertical direction in the surface of the end-plate body in which the outside ball circulation groove is formed, and a second insertion slit, which communicates with the first insertion slit, may be formed in a lateral direction in the surface of the end-plate body in which the outside ball circulation groove is formed.

In another aspect, the present invention provides a linear motion slider, including a plurality of balls; a block body, with a load ball passing groove formed in the block body in a longitudinal direction, and a no-load ball passing hole formed through the block body to correspond to the load ball passing groove; an end-plate mounted to each of front and rear ends of the block body, with an outside ball circulation groove formed in the end-plate; and a ball circulation support member disposed between the block body and each of the end-plates, with an inside ball circulation groove formed in the ball circulation support member to correspond to the outside ball circulation groove.

First and second support portions are provided on the circumferential inner surface of the end-plates and contact and support outside surfaces of the balls, and a space is defined between the outer surfaces of the balls and a junction surface between the first and second support portions.

Preferably, a first insertion slit may be formed in a vertical direction in the surface of each end-plate in which the outside ball circulation groove is formed, and a second insertion slit, which communicates with the first insertion slit, may be formed in a lateral direction in the surface of the end-plate in which the outside ball circulation groove is formed. The linear motion slider may further include a sealing member provided on an upper portion of the block body. The sealing member has a first insertion part inserted at opposite ends thereof into the first insertion slits of the respective end-plates; and a second insertion part bent from the first insertion part and inserted at opposite ends thereof into the second insertion slits of the respective end-plates. The sealing member is easily assembled with the end plates, and the sealing member conducts sealing and dustproofing functions.

The sealing member may further have protruding parts provided on respective opposite ends of the second insertion part and disposed outside the respective end plates, so that the sealing member can exhibit sealing and dustproofing effects even in spaces between the end-plates and a rail frame.

In a further aspect, the present invention provides an end-plate for linear motion sliders comprising an end-plate body. The end-plate body has therein first and second outside ball circulation grooves, a lubricant injection hole for supplying lubricant, a first connection passage, which communicates with the lubricant injection hole, a first lubricant inlet, which connects the first connection passage to the first outside ball circulation groove such that lubricant is supplied from the first connection passage to the first outside ball circulation groove, and a second lubricant inlet, which connects the first connection passage to the second outside ball circulation groove such that lubricant is supplied from the first connection passage to the second outside ball circulation groove.

The length of a path defined between the first outside ball circulation groove and the lubricant injection hole is shorter than the length of a path defined between the second outside ball circulation groove and the lubricant injection hole, and the cross sectional area of the first lubricant inlet is less than the cross sectional area of the second lubricant inlet.

Due to this structure, there is an advantage in that lubricant can be evenly supplied to the outside ball circulation grooves.

In yet another aspect, the present invention provides an end-plate for linear motion sliders comprising: an end-plate body having therein first and second outside ball circulation grooves, a lubricant injection hole for supplying lubricant, a first connection passage, which communicates with the lubricant injection hole, a first lubricant inlet, which connects the first connection passage to the first outside ball circulation groove such that lubricant is supplied from the first connection passage to the first outside ball circulation groove, and a second lubricant inlet, which connects the first connection passage to the second outside ball circulation groove such that lubricant is supplied from the first connection passage to the second outside ball circulation groove. The length of a path defined between the first outside ball circulation groove and the lubricant injection hole is shorter than the length of a path defined between the second outside ball circulation groove and the lubricant injection hole, and a minimum sectional area of the shortest path defined between the lubricant injection hole and the first lubricant inlet in the first connection passage is less than a minimum sectional area of the shortest path defined between the lubricant injection hole and the second lubricant inlet in the first connection passage.

Preferably, a through hole, through which a shaft is inserted, may be formed through the end-plate body, and a third lubricant inlet, which communicates with the through hole and the first connection passage, may be formed in the end-plate body, so that lubricant is supplied between the shaft and the through hole through the third lubricant inlet. Thus, lubricant can be efficiently supplied even to the gap between the shaft and the end-plate.

Furthermore, the end-plate may further comprise a ball circulation support member. The ball circulation support member includes support parts, which are disposed at upper and lower positions and each of which has therein an inside ball circulation groove, and a connection part, which connects the support parts to each other. A second connection passage, which communicates with the inside ball circulation groove, is formed in each support part. A third connection passage, which connects the upper and lower second connection passages to each other, is longitudinally formed in the ball circulation support member. A fourth lubricant inlet, which connects the third connection passage to the lubricant injection hole to supply lubricant to the ball circulation support member, is formed in the connection part in a lateral direction. Thus, lubricant can be efficiently supplied to the ball circulation support member. In addition, a process of assembling the ball circulation support member with the end-plate can be easily conducted.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a preferred embodiment of the present invention will be described in detail with reference to the attached drawings.

For reference, among components and structures of the present invention to be described herein below, the explanation of components and structures the same as those of the above-described conventional art refers to an explanation of the conventional art, thus further detailed explanation thereof will be omitted.

Figure 1:
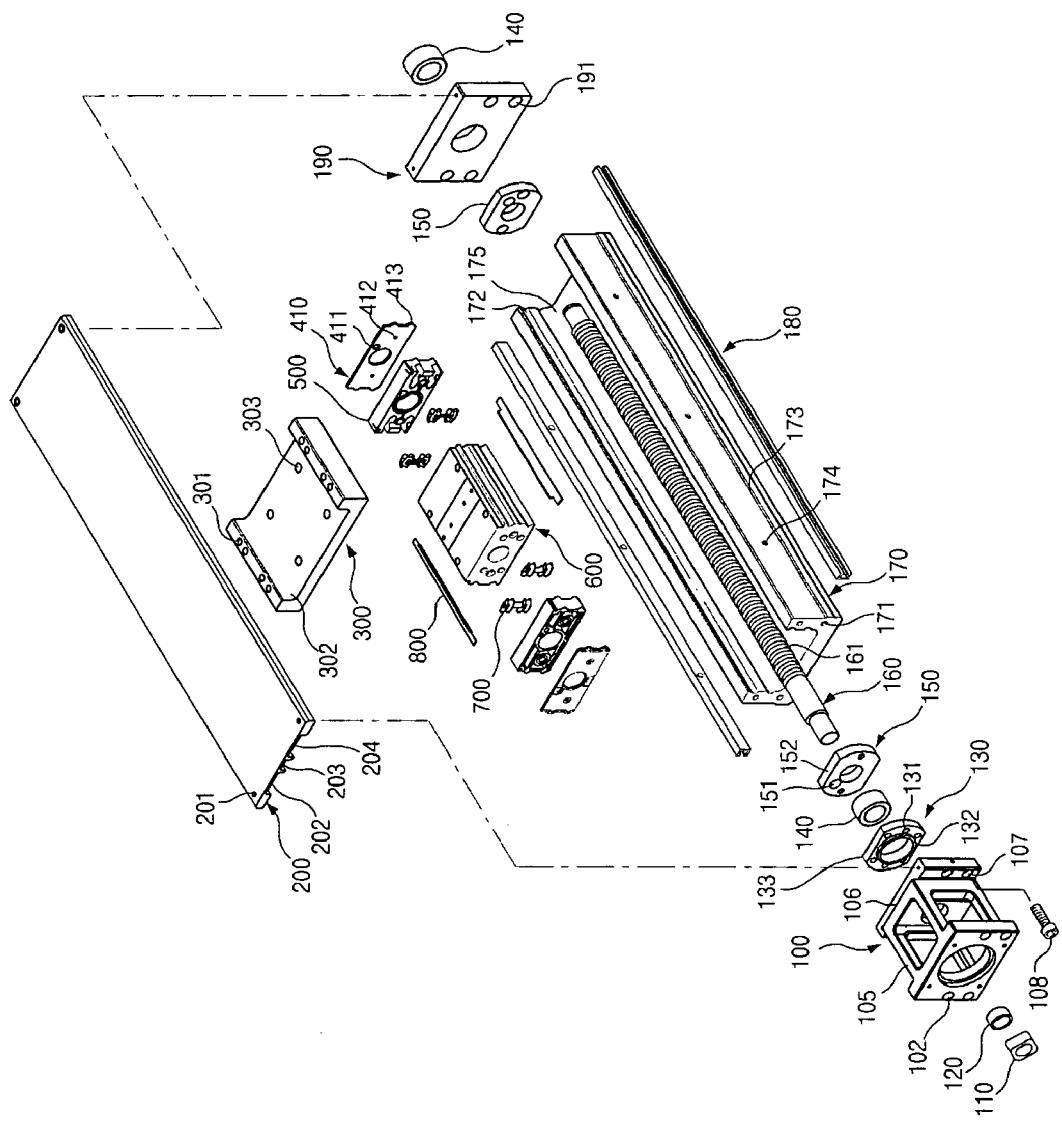
FIG. 1 is an exploded perspective view of a linear motion unit having a linear motion slider according to a preferred embodiment of the present invention.
Figure 2:
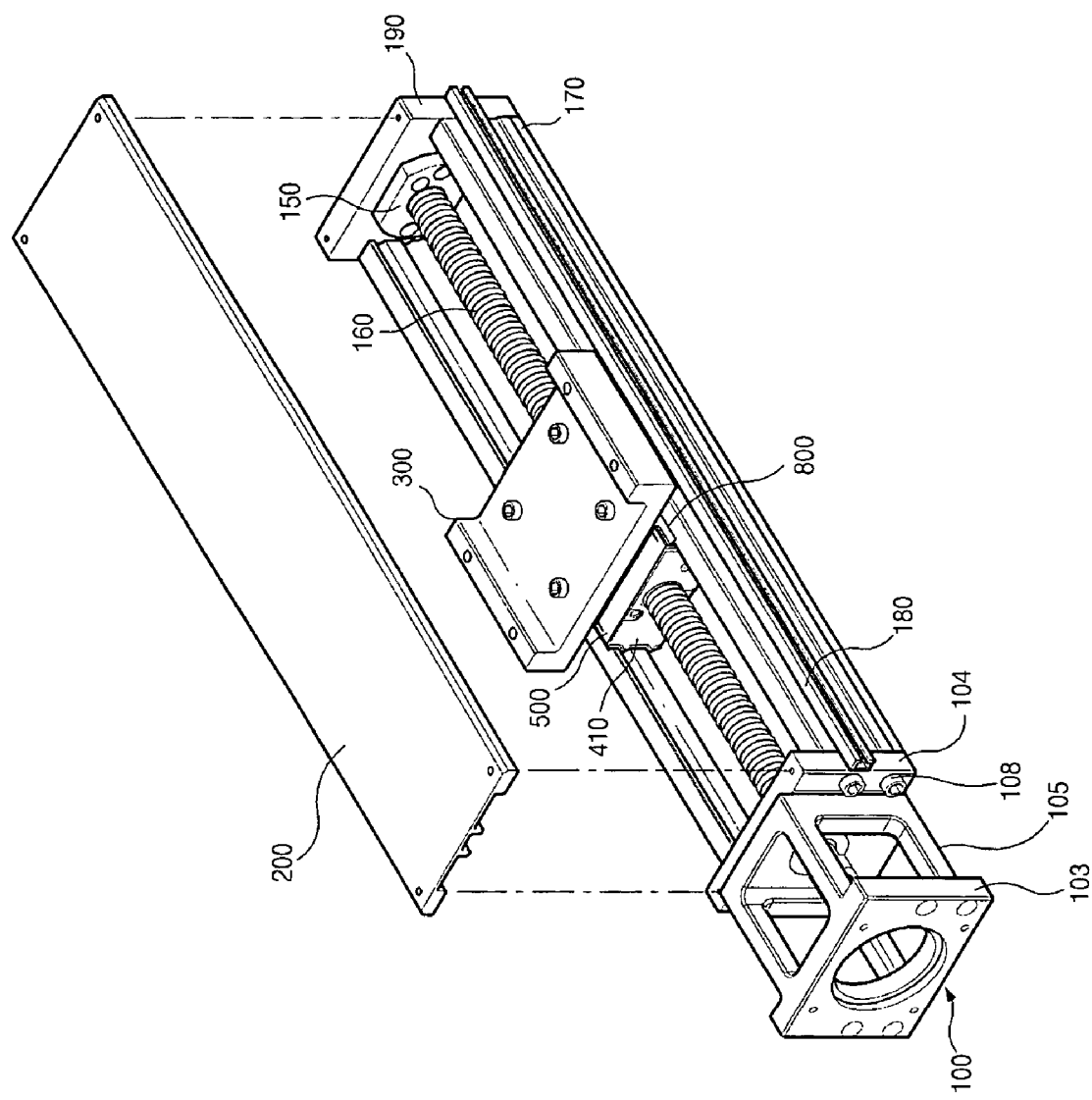
FIG. 2 is a perspective view showing the assembled linear motion unit of FIG. 1.
Figure 3:
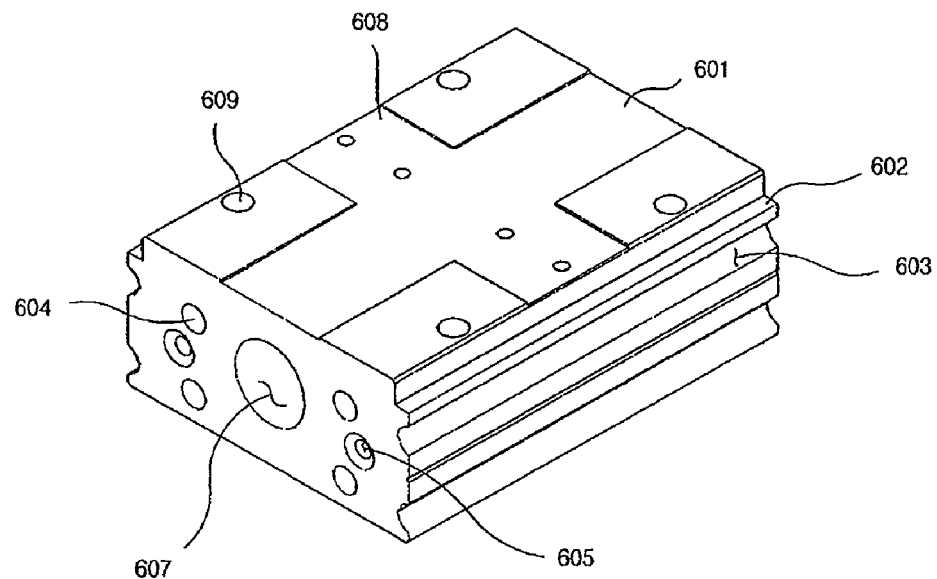
FIG. 3 is a perspective view showing a block body of the linear motion slider of FIG. 1.
Figure 4:
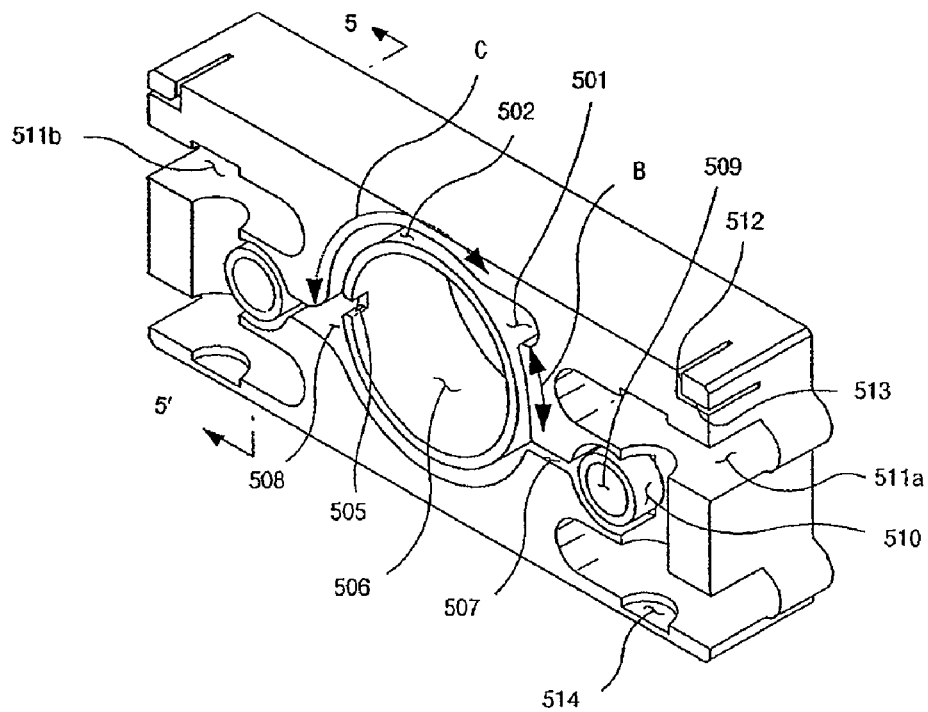
FIG. 4 is a perspective view showing an end-plate of the linear motion slider of FIG. 1.
Figure 5:
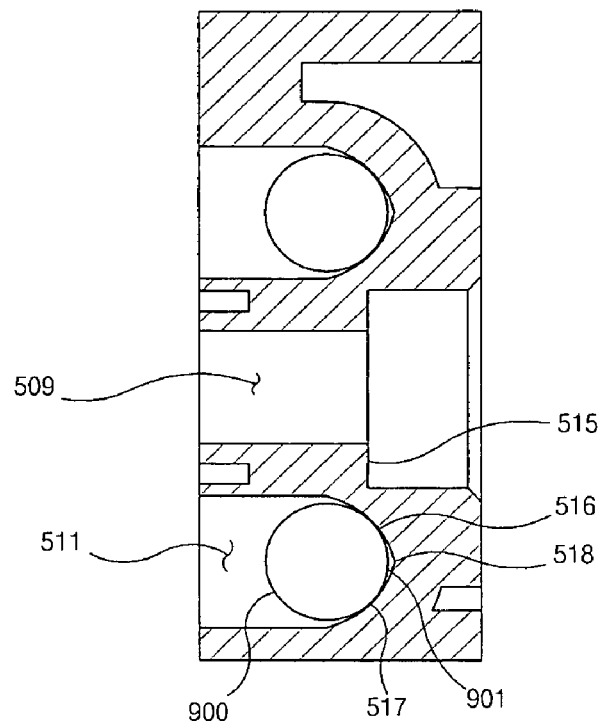
FIG. 5 is a sectional view taken along the line 5-5' of FIG. 4.
Figure 6:
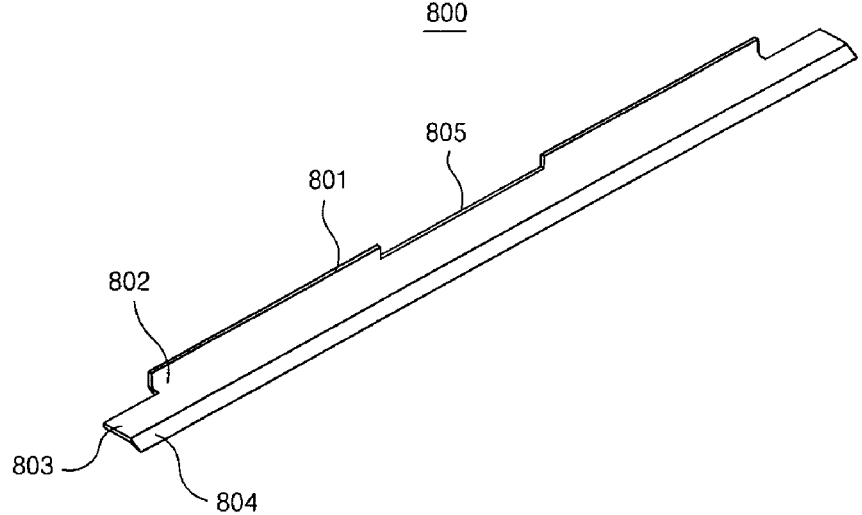
FIG. 6 is a perspective view showing a sealing member of the linear motion slider of FIG. 1.
Figure 7:
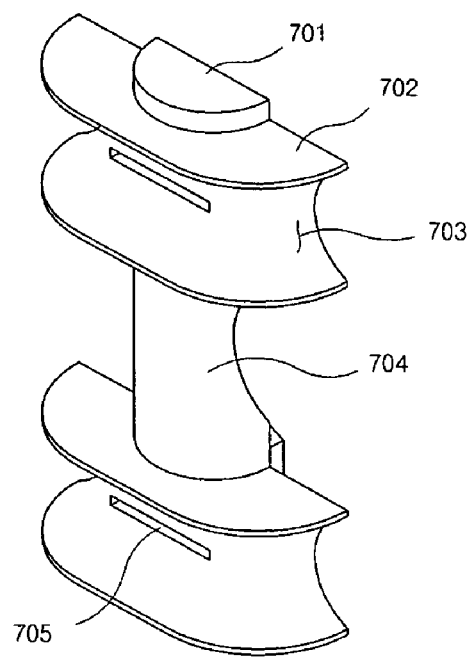
FIG. 7 is a perspective view showing a ball circulation support member of the linear motion slider of FIG. 1.
Figure 8:
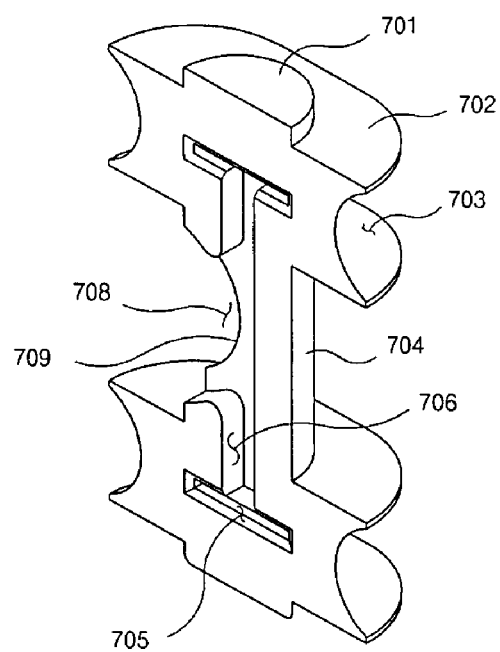
FIG. 8 is a rear perspective view showing a ball circulation support member of FIG. 7.
Figure 9:
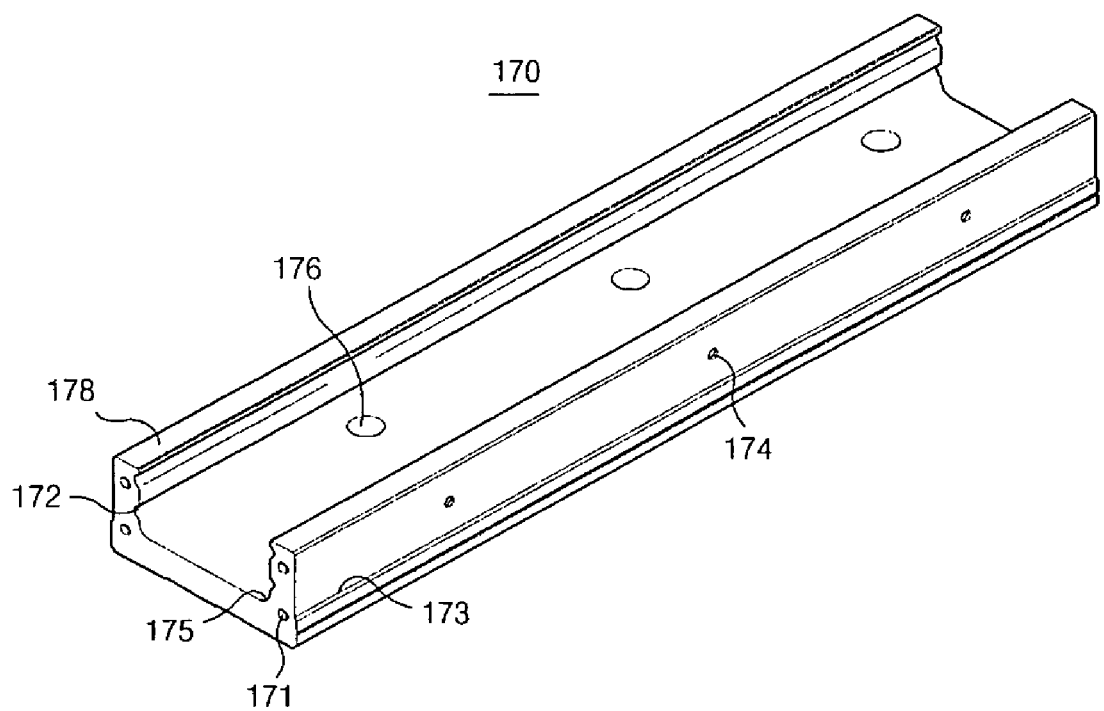
FIG. 9 is a perspective view showing a rail frame of the linear motion unit of FIG. 1.

FIG. 1 is an exploded perspective view of a linear motion unit having a linear motion slider according to the preferred embodiment of the present invention. FIG. 2 is a perspective view showing the assembled linear motion unit. FIG. 3 is a perspective view showing a block body 600 of the linear motion slider. FIG. 4 is a perspective view showing an end-plate 500 of the linear motion slider. FIG. 5 is a sectional view taken along the line 5-5' of FIG. 4. FIG. 6 is a perspective view showing a sealing member 800 of the linear motion slider. FIG. 7 is a perspective view showing a ball circulation support member 700 of the linear motion slider. FIG. 8 is a rear perspective view showing the ball inner surface circulating member 700. FIG. 9 is a perspective view showing a rail frame 170 of the linear motion unit.

As shown in FIGS. 1 through 9, the linear motion unit according to the preferred embodiment of the present invention includes the rail frame 170 and the linear motion slider, which moves along the rail frame 170.

As shown in FIG. 9, the rail frame 170 has sidewalls 178 on opposite sides thereof.

Ball guide grooves 172 are formed at respective upper and lower positions in an inner surface of each sidewall 178 in a longitudinal direction of the rail frame 170.

Furthermore, a round part 175 is formed along a corner of a junction between the bottom of the rail frame 170 and each sidewall 178.

A support stop 173, on which a sensor rail 180 is supported, is provided on an outer surface of each sidewall 178 in a longitudinal direction. A hole 174 is formed above the support stop 173 in the outer surface of each sidewall 178, so that each sensor rail 180 is mounted to each sidewall 178 through the holes 174.

As well, a hole 171 is formed in each of front and rear ends of each sidewall 178, so that a front cover 100 and a rear cover 190 are respectively mounted to the front and rear ends of the rail frame 170 through the holes 171.

A plurality of mounting holes 176 is formed in the bottom of the rail frame 170 at predetermined positions along a longitudinal line, so that the linear motion unit is mounted to a desired object using the mounting holes 176.

Each sensor rail 180 includes first bent parts, which are bent outwards from respective upper and lower ends thereof, and a second bent part, which is bent downwards from each first bent part. The sensor rail 180 serves to guide the linear movement of a sensor.

A ball screw 160 is provided through the linear motion slider. The front and rear ends of the ball screw 160 are rotatably supported by the front and rear covers 100 and 190, respectively, using bearings 140.

Furthermore, the ball screw 160 has threads 161 on a circumferential outer surface thereof.

A through hole is formed through the linear motion slider. The ball screw 160 is inserted into the through hole of the slider. Here, an internal thread, which engages with the threads 161 of the ball screw 160, may be formed on the circumferential inner surface of the through hole of the slider. Alternatively, a separate nut, which engages with the threads 161 of the ball screw 160, may be mounted to the slider.

Due to this structure, rotation of the ball screw 160 is converted into linear motion of the slider.

Meanwhile, a damper 150, a flange 130, a bearing 140, the front cover 100, a collar 120 and a locking nut 110 are consecutively fitted over the front end of the ball screw 160.

A damper 150, a bearing 140 and the rear cover 190 are consecutively fitted over the rear end of the ball screw 160.

The front cover 100 includes a front plate 103, a rear plate 104, and longitudinal frames 105, which couple the front plate 103 to the rear plate 104 and are disposed at upper and lower positions on opposite sides of the front and rear plates 103 and 104.

The longitudinal frames 105, which are disposed at opposite sides, are coupled through lateral frames 106.

The lateral frames 106 are coupled to the rear surface of the rear plate 104 of the front cover 100. Of the lateral frames 106, the upper lateral frame 106 is disposed at a position higher than the upper end of the rear plate 104.

Meanwhile, through holes 107 are formed through the rear plate 104 of the front cover 100, such that the rear plate 104 is mounted to the rail frame 170 using bolts 108, which are fitted into the respective through holes 107. Furthermore, through holes 102 are formed through the front plate 103 at positions corresponding to the through holes 107 of the rear plate 104.

As well, a through hole is formed at a central position through the front plate 103, and a stepped part is provided around the through hole of the front plate 103.

The flange 130 has planar surface parts 133 on respective upper and lower ends thereof. A through hole, into which the ball screw 160 is inserted, is formed at a central position through the flange 130. A ring-shaped protrusion 132 is provided on the front surface of the flange 130 around the through hole of the flange 130.

A plurality of holes 131 is formed through the flange 130 around the ring-shaped protrusion 132, so that the flange 130 is fastened to the rear plate 104 through holes 131.

The damper 150 has planar surface parts 152 on upper and lower ends thereof in a manner similar to that of the flange 130. A hole 151 is formed in the damper 150 at an eccentric position adjacent to the upper end of the damper 150.

The rear cover 190 has at a central position thereof a center hole, into which the ball screw 160 is inserted. Other holes 191 are formed through the rear cover 190 at opposite sides of the center hole, such that the rear cover 190 can be mounted to the rail frame 170 through the holes 191.

Meanwhile, the linear motion slider includes a plurality of balls 900 and the block body 600. A plurality of load ball passing grooves 603 is formed in the block body 600 in a longitudinal direction, and no-load ball passing holes 604 are formed through the block body 600 at positions respectively corresponding to the load ball passing grooves 603. The linear motion slider further includes the end-plates 500, which are disposed on respective front and rear ends of the block body 600, and each of which has a plurality of outside ball circulation grooves therein. The linear motion slider further includes a plurality of ball circulation support members 700, which are disposed between the block body 600 and each end-plate 500, and each of which has inside ball circulation grooves 703 corresponding to the respective outside ball circulation grooves. The linear motion slider having the above-mention construction linearly moves along the rail frame 170.

In detail, the load ball passing grooves 603 are formed in each side surface of the block body 600.

Furthermore, a through hole 607, into which the ball screw 160 is inserted, is formed at a central position through the block body 600 in a longitudinal direction.

The no-load ball passing holes 604 are formed in the block body 600 at upper and lower positions of opposite sides of the through hole 607 which correspond to the load ball passing grooves 603.

Furthermore, seating grooves 602 are formed at respective opposite upper corners of the block body 600 in a longitudinal direction.

A plurality of holes 609 is formed in an upper surface of the block body 600, so that a table 300 is mounted to the block body 600 through the holes 609.

As well, depressions 601 and 608 are formed in the upper surface of the block body 600 in longitudinal and lateral directions, respectively.

Here, the depressions 601, 608 may be formed in a shape.

Moreover, a hole, which communicates with the depression 608, may be formed in the upper surface of the block body 600.

The end-plates 500 are respectively disposed on front and rear ends of the block body 600. Each end-plate 500 has the outside ball circulation grooves therein.

A through hole 506, into which the ball screw 160, serving as a shaft, is inserted, is formed at a central position through each end-plate 500.

The outside ball circulation grooves include a first outside ball circulation groove 511a, which is formed above the right side of the through hole 506 in the end-plate 500, and a second outside ball circulation groove 511b, which is formed above the left side of the through hole 506 in the end-plate 500.

Furthermore, outside ball circulation grooves are formed at lower positions of opposite sides of the through hole 506, such that they are symmetrical with respect to the first and second outside ball circulation grooves 511a and 511b.

As shown in FIG. 5, a first support portion 516 and a second support portion 517 which contact the related balls 900 are provided in the circumferential inner surface of the end-plate 500. A space is defined between an outer surface 901 of the ball 900 and a junction surface 518 between the first support portion 516 and the second support portion 517.

Each ball 900 is in point contact with the first and second support portions 516 and 517.

Furthermore, the space serves to keep lubricant therein, so that, when the balls 900 move along the outside ball circulation groove, lubricant can be efficiently supplied between the ball 900 and the circumferential inner surface of the end-plate 500.

Therefore, the balls 900 can smoothly move, and the ball 900 and the end-plate 500 are prevented from being damaged.

The first support portion 516 and the second support portion 517 are formed in each outside ball circulation groove in the direction in which the balls 900 circulate around the block body 600.

Each of the first and second support portions 516 and 517 is the portion defined from the outer side of the circumferential inner surface of the end-plate 500 to a point of contact with the ball 900. The junction surface 518 is the portion defined from the point of contact between the first support portion 516 and the ball 900 to the point of contact between the second support portion 517 and the ball 900.

The first support portion 516 has the same shape as that of the second support portion 517. The first support portion 516 has an arc shape that has a radius larger than the radius of the ball 900.

The first support portion 516 and the second support portion 517 are disposed at upper and lower positions so as to be symmetrical with each other based on a horizontal plane passing through the center of the outside ball circulation groove.

That is, the first support portion 516 is formed above the horizontal plane passing through the center of the outside ball circulation groove, and the second support portion 517 is formed under the horizontal plane passing through the center of the outside ball circulation groove.

Due to this structure, when the balls 900 are inserted into the outside ball circulation groove, each ball 900 moves along the outside ball circulation groove and is supported by the first and second support portions 516 and 517 before exiting the outside ball circulation groove towards the block body 600.

Furthermore, because the first and second support portions 516 and 517 are symmetrically disposed, the center of each ball 900, which is supported by the first and second support portions 516 and 517, is positioned in the horizontal plane passing through the center of the outside ball circulation groove.

Therefore, the balls 900 can stably move without being biased to one side of the outside ball circulation groove.

Moreover, other support portions may be provided in each outside ball circulation groove of the end-plate 500, such that the number of positions at which the ball 900 contacts the end-plate 500 is increased, thus more stably supporting the ball 900.

Meanwhile, a bolt seat 515, which communicates with a mounting hole 509, and on which a bolt or the like is seated, is formed in the rear surface of the end-plate 500.

Furthermore, a first insertion slit 512, which is oriented in a vertical direction, and a second insertion slit 513, which communicates with the first insertion slit 512 and is oriented in a lateral direction, are formed at each of opposite sides of an upper end of the surface (hereinafter, referred to simply as a front surface) of the end-plate in which the outside ball circulation grooves are formed.

As well, a groove, which communicates with the second insertion slit 513, and into which a protruding part 803 of each sealing member 800 is inserted, may be formed at an upper position in each side surface of the end-plate 500 in a forward and backward direction.

A lubricant injection hole 501, through which lubricant is supplied into the linear motion slider, is formed at an eccentric position through the upper part of the end-plate 500.

In detail, the lubricant injection hole 501 is formed at a predetermined position such that the overall length of the lubricant path defined between the first outside ball circulation groove 511a and the lubricant injection hole 501 is shorter than the overall length of the lubricant path between the second outside ball circulation groove 511b and the lubricant injection hole 501.

A first connection passage 502 communicates with the lubricant injection hole 501 and is formed around the circumference of the through hole 506. The first connection passage 502 has a constant cross sectional area.

A first lubricant inlet 507 connects the first connection passage 502 to the first outside ball circulation groove 511a, such that lubricant is supplied from the first connection passage 502 to the first outside ball circulation groove 511a through the first lubricant inlet 507.

A second lubricant inlet 508 connects the first connection passage 502 to the second outside ball circulation groove 511b, such that lubricant is supplied from the first connection passage 502 to the second outside ball circulation groove 511b through the second lubricant inlet 508.

Here, because resistance is in proportion to the length of a path, the resistance of the entire lubricant path defined between the first outside ball circulation groove 511a and the lubricant injection hole 501 is less than the resistance of the entire lubricant path defined between the second outside ball circulation groove 511b and the lubricant injection hole 501.

Therefore, to prevent lubricant from unevenly flowing due to the difference in resistance, the present invention is constructed such that the cross sectional area of the first lubricant inlet 507 is smaller than the cross sectional area of the second lubricant inlet 508.

In this case, because resistance is in reverse proportion to the cross sectional area, the resistance of the second lubricant inlet 508 having the larger cross sectional area is less than the resistance in the first lubricant inlet 507.

Preferably, corners of a junction between the second lubricant inlet 508 and the first connection passage 502 are rounded to reduce resistance.

Therefore, even if the lubricant injection hole 501 is disposed at a position adjacent to the first lubricant inlet 507, because the amount of resistance between the opposite lubricant paths is about the same, lubricant can be evenly supplied to the first and second outside ball circulation grooves 511*a* and 511*b*.

Unlike the above-mentioned structure, the end-plate 500 may be constructed such that a minimum sectional area of the shortest path (B) defined between the lubricant injection hole 501 and the first lubricant inlet 507 in the first connection passage 502, is less than a minimum sectional area of the shortest path (C) defined between the lubricant injection hole 501 and the second lubricant inlet 508 in the first connection passage 502, so that lubricant can be evenly supplied into the outside ball circulation grooves.

In other words, the first connection passage 502 is configured such that the cross sectional area thereof is not constant, that is, such that the cross sectional area of an end of the shortest path (B) defined between the lubricant injection hole 501 and the first lubricant inlet 507 is reduced, or, alternatively, such that the cross sectional area of an end of the shortest path (C) defined between the lubricant injection hole 501 and the second lubricant inlet 508 is increased. Then, the resistance in the second lubricant inlet 508 is reduced compared to the resistance in the first lubricant inlet 507.

Meanwhile, an insertion groove 510, which extends upwards and downwards, is formed at each of opposite sides of the through hole 506 in the end-plate 500. The outside ball circulation grooves, which are formed at upper and lower positions in each of the opposite sides of the through hole 506, communicate with each other through each insertion groove 510.

Furthermore, mounting holes 509 are formed through the end-plate 500 at positions between the through hole 506 and the insertion grooves 510.

Each of the first and second lubricant inlets 507 and 508 is formed around each mounting hole 509 and is connected to each insertion groove 510.

A third lubricant inlet 505 communicates both with the through hole 506 and with the first connection passage 502, such that lubricant can be supplied between the ball screw 160 and the inner surface of the through hole 506.

The third lubricant inlet 505 is formed at a position adjacent to the second lubricant inlet 508.

On the opposite end surfaces of the end-plate 500, protrusions, which have shapes corresponding to the ball guide grooves 172 of the rail frame 170, are provided at upper and lower positions, so that the protrusions are inserted into the respective ball guide grooves 172.

Meanwhile, each ball circulation support member 700 has the inside ball circulation grooves 703 corresponding to the outside ball circulation grooves of the end-plate 500. The ball circulation support members 700 are disposed between the block body 600 and the end-plates 500.

In detail, each ball circulation support member 700 includes support parts 702, each of which has the inside ball circulation groove 703, and which are disposed at upper and lower positions, and a connection part 704, which connects the support parts 702 to each other.

Each inside ball circulation groove 703 is formed around the circumferential outer surface of each support part 702.

Each support part 702 has a shape corresponding to the shape of the related outside ball circulation groove of the end-plate 500. Furthermore, the connection part 704 has a semicircular cross-sectional shape corresponding to the shape of the insertion groove 510 of the end-plate 500.

As well, an insertion protrusion 701, which has a semicircular cross-sectional shape corresponding to each insertion seat 514 formed in the end-plate 500, is provided on each of upper end lower ends of the ball circulation support member 700.

When the ball circulation support member 700 is assembled with the end-plate 500, the connection part 704 is inserted into the related insertion groove 510, and the insertion protrusions 701 are seated into the related insertion seats 514, which are formed at upper and lower positions in the end-plate 500.

Therefore, there are advantages in that assembly is easy and a process is simplified.

A second connection passage 705 is formed in each support part 702 such that it communicates with the related inside ball circulation groove 703.

Furthermore, a third connection passage 706 is longitudinally formed in the surface of each ball circulation support member 700 opposite the surface in which the inside ball circulation grooves 703 are formed. The third connection passage 706 connects the second connection passages 705, which are formed at upper and lower positions in the ball circulation support member 700, to each other.

Furthermore, a fourth lubricant inlet 708 is formed in the connection part 704 of each ball circulation support member 700 so that the connection part 704 is open in a lateral direction through the fourth lubricant inlet 708. Thus, the third connection passage 7*b*6 is connected to the lubricant injection hole 501 through the fourth lubricant inlet 708, so that lubricant is supplied into the ball circulation support member 700 therethrough.

Moreover, the sectional area of the fourth lubricant inlet 708 is increased from the inside of the ball circulation support member 700 to the outside, such that lubricant can be smoothly drawn from the first or second lubricant inlet 507 or 508 into the ball circulation support member 700.

In other words, the fourth lubricant inlet 708 has a tapered shape.

Furthermore, to prevent the ball circulation support member 700 from interfering with the mounting hole 509 of the end-plate 500, a semicircular notch 709 may be formed in the connection part 704 at a position adjacent to the mounting hole 509 when the ball circulation support member 700 is assembled with the end-plate 500.

Unlike the above-mentioned construction, the ball circulation support members 700 may be integrally provided on the block body 600.

Meanwhile, the sealing members 800 are provided on respective opposite side surfaces of the block body 600.

Each sealing member 800 includes a first insertion part 801, opposite ends of which are inserted into the first insertion slits 512 of the respective end-plates 500, and a second insertion part 801, which is bent from the respective first insertion parts 801, and opposite ends of which are inserted into the respective second insertion slits 513 of the respective end-plates 500.

Furthermore, a plurality of holes may be formed in the second insertion part 802 in a longitudinal direction such that a process of forming the sealing member 800 can be conducted more easily.

The protruding parts 803 are provided at opposite ends of the second insertion part 802 and disposed outside the respective end-plates 500.

Because the sealing members 800 have the protruding parts 803, the sealing members 800 can exhibit sealing and dust-proofing effects even in spaces between the end-plates 500 and the rail frame 170.

Furthermore, a rectangular notch 805 is formed in the upper edge of the first insertion part 801.

An inclined part 804 is provided on one side of the second insertion part 802.

An edge of each inclined part 804 is in close contact with each sidewall of the rail frame 170, thus more efficiently conducting sealing and dustproofing functions.

To assemble each sealing member 800 with the slider, the opposite ends of the first and second insertion parts 801 and 802 are respectively inserted into the first and second insertion slits 512 and 513 of the end-plates 500. Thereafter, the sealing member 800 is seated into the related seating groove 602 of the block body 600, thus completing the assembly process.

Thanks to this structure, the process of assembling the sealing members 800 with the slider is simplified, and the sealing and dustproofing effects are reliably ensured.

Furthermore, when coupling the sealing member 800 to the slider, because no separate locking means such as a bolt is required, a compact slider structure can be realized.

An end seal 410 is provided on the outside surface of each of the end-plates 500, which are disposed at front and rear positions of the slider.

A through hole, into which the ball screw 160 is inserted, is formed at a central position through each end seal 410. Furthermore, a supply hole, into which a lubricant supply nipple is inserted, is formed through each end seal 410 at a position corresponding to the lubricant injection hole 501 of the related end-plate.

Mounting holes 412 are formed through each end seal 410 at opposite sides of the through hole, so that the end seal 410 is mounted to the related end-plate 500 through mounting holes 412.

Furthermore, insertion protrusions 413, which are inserted into the respective ball guide grooves 172, are provided at upper and lower positions on opposite edges of each end seal 410.

Meanwhile, the table 300 is placed on the block body 600 and above the rail frame 170. Mounting holes 303 are formed through the bottom of the table 300, so that the table 300 is mounted to the block body 600 through the mounting holes 303.

In addition, protrusions are provided on respective opposite ends of the table 300. A rounded part 302 is provided at the junction between the bottom of the table 300 and each protrusion.

Mounting holes 301 are formed in each protrusion of the table 300, such that a desired object can be fastened to the table 300.

An upper cover 200 is disposed above the table 300. Mounting holes 201 are formed through the upper cover 200 at positions adjacent to the respective corners thereof, so that the upper cover 200 is mounted to the upper ends of the front cover 100 and the rear cover 190 through the mounting holes 201.

Guide grooves 202 and 204 are formed in the rear surface of the upper cover 200 in a longitudinal direction. Furthermore, a groove 203 is longitudinally formed in the rear surface of the upper cover 200 between the two guide grooves 202 and 204.

As described above, in the present invention, first and second support portions, which contact the outer surfaces of balls and support the balls, are provided in the circumferential inner surface of end-plate, and a space is defined between the outer surfaces of the balls and a junction surface between the first and second support portions. Thus, the stiffness of the end-plate is increased, and the balls can stably circulate in a linear motion slider, thereby reducing noise and vibration. Furthermore, because the space serves to keep lubricant therein, the balls can more efficiently circulate in the slider.

As well, the first support portion is disposed above a horizontal plane passing through the center of each outside ball circulation groove, and the second support portion is disposed below the horizontal plane passing through the center of the outside ball circulation groove. Thus, the balls can stably move without being biased to one side of the outside ball circulation groove.

In addition, a first insertion slit is formed in a vertical direction in the surface of each end-plate in which the outside ball circulation groove is formed, and a second insertion slit, which communicates with the first insertion slit, is formed in a lateral direction in the surface of the end-plate in which the outside ball circulation groove is formed. The linear motion slider includes sealing members. Each sealing member, which is provided on an upper portion of the block body, has a first insertion part, which is inserted at opposite ends thereof into the first insertion slits of the respective end-plates, and a second insertion part, which is bent from the first insertion part and inserted at opposite ends thereof into the second insertion slits of the respective end-plates. Thanks to this structure, the sealing members can be easily assembled with the end plates. The sealing members can conduct sealing and dustproofing functions.

Each sealing member has protruding parts, which are provided on respective opposite ends of the second insertion part and are disposed outside the respective end plates, so that the sealing members can exhibit sealing and dustproofing effects even in spaces between the end-plates and a rail frame.

In each end plate, the length of a path between the first outside ball circulation groove and the lubricant injection hole is shorter than the length of a path between the second outside ball circulation groove and the lubricant injection hole, while the cross sectional area of a first lubricant inlet is less than the cross sectional area of a second lubricant inlet. Therefore, lubricant can be evenly supplied to the outside ball circulation grooves.

Furthermore, a through hole, through which a shaft is inserted, is formed through each end-plate, and a third lubricant inlet, which communicates with the through hole and the first connection passage, is formed in the end-plate body, so that lubricant is supplied between the shaft and the through hole through the third lubricant inlet. Thus, lubricant can be efficiently supplied even to the gap between the shaft and the end-plate.

Moreover, the end-plate further includes a ball circulation support member. The ball circulation support member includes support parts, which are disposed at upper and lower positions, and each of which has therein an inside ball circulation groove, and a connection part, which connects the support parts to each other. A second connection passage, which communicates with the inside ball circulation groove, is formed in each support part. A third connection passage, which connects the upper and lower second connection passages to each other, is longitudinally formed in the ball circulation support member. A fourth lubricant inlet, which connects the third connection passage to the lubricant injection hole such that lubricant is supplied to the ball circulation support member, is formed in the connection part in a lateral direction. Thus, lubricant can be efficiently supplied to the ball circulation support member. In addition, a process of assembling the ball circulation support member with the end-plate can be easily conducted.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An end-plate for a linear motion slider, comprising an end-plate body having at least one outside ball circulation groove,
  wherein said circulation groove comprise first and second support portions provided in a circumferential inner surface of the end-plate body;
  wherein said support portions contact and support outer surfaces of balls, and a space is defined between the outer surfaces of the balls and a junction surface between the first and second support portions; and
  wherein a first insertion slit is formed in a vertical direction in a surface of the end-plate body in which the outside ball circulation groove is formed, and a second insertion slit, which communicates with the first insertion slit, is formed in a lateral direction in the surface of the end-plate body in which the outside ball circulation groove is formed.

2. The end-plate as set forth in claim 1,
  wherein the first support portion is disposed above a horizontal plane passing through a center of the outside ball circulation groove, and the second support portion is disposed below the horizontal plane passing through the center of the outside ball circulation groove.

3. A linear motion slider, comprising:
  a plurality of balls;
  a block body, with a load ball passing groove formed in the block body in a longitudinal direction, and a no-load ball passing hole formed through the block body to correspond to the load ball passing groove;
  an end-plate mounted to each of front and rear ends of the block body, with at least one outside ball circulation groove formed in the end-plate; and
  a ball circulation support member disposed between the block body and each of the end-plates, with an inside ball circulation groove formed in the ball circulation support member to correspond to the outside ball circulation groove,
  wherein said circulation groove comprises first and second support portions provided in a circumferential inner surface of the end-plates wherein said support portions contact and support outer surfaces of the balls, and a space is defined between the outer surfaces of the balls and a junction surface between the first and second support portions; and
  wherein a first insertion slit is formed in a vertical direction in a surface of each end-plate in which the outside ball circulation groove is formed, and a second insertion slit, which communicates with the first insertion slit, is formed in a lateral direction in the surface of the end-plate in which the outside ball circulation groove is formed, the linear motion slider further comprising:
  a sealing member provided on an upper portion of the block body, the sealing member comprising: a first insertion part inserted at opposite ends thereof into the first insertion slits of the respective end-plates; and a second insertion part bent from the first insertion part and inserted at opposite ends thereof into the second insertion slits of the respective end-plates.

4. The linear motion slider as set forth in claim 3, wherein the sealing member further comprises protruding parts provided on respective opposite ends of the second insertion part and disposed outside the respective end plates.

* * * * *